United States Patent
Keyes et al.

(10) Patent No.: US 10,346,632 B2
(45) Date of Patent: *Jul. 9, 2019

(54) ENTITY SECURITY IMPLIED BY AN ASSET IN A REPOSITORY SYSTEM

(71) Applicant: Oracle International Corporation, Redwood Shores, CA (US)

(72) Inventors: David Keyes, Clinton, OH (US); Muthukumar Palanisamy, Coimbatore (IN); David Edward DiFranco, Webster Groves, MO (US); Dennis M. Chin, Stow, OH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/715,029

(22) Filed: Sep. 25, 2017

(65) Prior Publication Data

US 2018/0025173 A1    Jan. 25, 2018

Related U.S. Application Data

(63) Continuation of application No. 14/476,630, filed on Sep. 3, 2014, now Pat. No. 9,779,261.
(Continued)

(51) Int. Cl.
*G06F 21/00* (2013.01)
*G06F 21/62* (2013.01)
(Continued)

(52) U.S. Cl.
CPC ........ *G06F 21/6218* (2013.01); *G06F 21/604* (2013.01); *G06F 2221/2141* (2013.01); *H04L 63/20* (2013.01)

(58) Field of Classification Search
None
See application file for complete search history.

(56) References Cited

U.S. PATENT DOCUMENTS

| 8,280,919 B2 | 10/2012 | Krishnaswamy et al. |
| 8,516,548 B2 | 8/2013 | Lerner et al. |

(Continued)

FOREIGN PATENT DOCUMENTS

| EP | 1978464 | 10/2008 |
| WO | 2013155344 | 10/2013 |

OTHER PUBLICATIONS

U.S. Appl. No. 14/476,630, Corrected Notice of Allowability dated Jun. 15, 2017, 15 pages.
(Continued)

*Primary Examiner* — Alexander Lagor
(74) *Attorney, Agent, or Firm* — Kilpatrick Townsend & Stockton LLP

(57) ABSTRACT

Techniques are described for managing access to a repository system storing information (e.g. metadata) about objects (e.g. an application a process or a service) in a computing environment. The repository system can store a data structure (an "entity") that includes information about an object. An entity can have an association with one or more collections of entities ("assets") that classify a collection of entities. Access to perform actions (e.g. create read update or delete) an entity can be managed based on an entitlement which grants a right to access information in the entity and/or at least one asset having an association with the entity. The repository system can manage access to one or more entities based on rights implied by an entitlement to access one or more assets associated with those entities.

20 Claims, 9 Drawing Sheets

Related U.S. Application Data

(60) Provisional application No. 61/880,832, filed on Sep. 20, 2013.

(51) Int. Cl.
   *G06F 21/60* (2013.01)
   *H04L 29/06* (2006.01)

(56) References Cited

U.S. PATENT DOCUMENTS

| | | |
|---|---|---|
| 9,779,261 B2 | 10/2017 | Keyes et al. |
| 2006/0050870 A1 | 3/2006 | Kimmel et al. |
| 2011/0302622 A1 | 12/2011 | Bregman et al. |
| 2015/0180872 A1* | 6/2015 | Christner ............... H04L 63/10 726/4 |

OTHER PUBLICATIONS

U.S. Appl. No. 14/476,630, Final Office Action dated Jun. 17, 2016, 14 pages.
U.S. Appl. No. 14/476,630, Non Final Office Action dated Oct. 26, 2016, 12 pages.
U.S. Appl. No. 14/476,630, Non-Final Office Action dated Nov. 20, 2015, 11 pages.
U.S. Appl. No. 14/476,630, Notice of Allowance dated May 31, 2017, 18 pages.

* cited by examiner

```xml
<?xml version="1.0" encoding="UTF-8" standalone="yes"?>
<policy xmlns="http://www.corporation.com/repository_system/accesspolicy">
    <description> Governance Policy </description>
    <permission>
        <resourceEntry>
            <resNameExp>
                <typeName>GOVERNED_ENTITY_TYPE</typeName>
                <expression>
                    Governance Asset
                        {http://www.oracle.com/metamodels/governance}
                </expression>
            </resNameExp>
            <actions>CREATE</actions>
            <actions>DELETE</actions>
        </resourceEntry>
    </permission>
    <principal>
        <type>ROLE</type>
        <name>Architect</name>
    </principal>
    <obligation>
        <attAssgnName>PREDICATE_ALLOW_GOVERNED_ENTITY_TYPE</attAssgnName>
        <attrAssgnsValue>soasuite#1:Composite</attrAssgnValue>
    </obligation>
    <obligation>
        <attAssgnName>PREDICATE_ALLOW_GOVERNED_ENTITY_TYPE</attAssgnName>
        <attrAssgnsValue>soasuite#2:Composite</attrAssgnValue>
    </obligation>
</policy>
```

- 510: typeName/expression block
- 520: actions block
- 530: principal block
- 540: first obligation
- 550: second obligation

FIG. 5

ENTITY SECURITY IMPLIED BY AN ASSET IN A REPOSITORY SYSTEM

CROSS-REFERENCES TO RELATED APPLICATIONS

The present application claims benefit and priority as a continuation application of U.S. patent application Ser. No. 14/476,630, filed on Sep. 3, 2014, entitled "ENTITY SECURITY IMPLIED BY AN ASSET IN A REPOSITORY SYSTEM," which is a non-provisional application and claims the benefit and priority of U.S. Provisional Application No. 61/880,832, filed Sep. 20, 2013, entitled "ENTITY SECURITY IMPLIED BY AN ASSET IN A REPOSITORY SYSTEM." Each of the above-identified patent applications are herein incorporated by reference in their entirety for all purposes.

TECHNICAL FIELD

The present disclosure relates generally to managing access a repository system.

BACKGROUND

Repository systems can perform various functions including managing information about objects (e.g., an application, a process, a service, or a component) an in a computing environment. Some repository systems may associate a collection of related objects in an asset. An asset may be used to manage information about the collection of objects. Repository systems may vary in the ways by which access is permitted to information stored about an object. A repository system may be accessed by users associated with different types of roles for operating the repository system. A role associated with a user may enable the user to have rights to access information related to an object stored in the repository system.

Some repository systems may administer access to a repository system in a coarse-grained fashion. In such implementations, access to information associated with objects in an asset can be determined based on the entire asset as a whole such that access may be based on access to all of the objects in the asset. For example, a composite application can be defined as an asset having objects including composite services, references, and components. The objects can be modeled as attributes of the asset representing the composite application. However, access to information about individual objects that define an asset may not be permitted because the objects may be modeled as attributes of the asset and access may be controlled with respect to the asset. As a result, access may not be permitted for the individual objects that define the asset. In other implementations, a repository system may manage access to objects individually in a fine-grained manner. Using a fine-grained approach, access to each object can be determined based on access with respect to each object; however, the repository system can incur a significant amount of processing time to determine access to individual objects, as there may be many objects stored in a repository system.

In a repository system that can store information for a large amount objects, performance for processing requests to access different objects may place a burden on overall processing performance for the repository system. Additional processing that may be performed to determine access for each object in a collection of objects can result in increased processing time to determine access to information about each object.

BRIEF SUMMARY

The present disclosure relates generally to techniques for managing access to a repository system for information (e.g., metadata) about objects in a computing environment. In certain embodiments, a computing environment can include many types of objects including an application, a process, a service, a method, or other object in a computing environment. The repository system can store a data structure (an "entity") that includes information (e.g., metadata) about an object in a computing environment. An entity can have an association with one or more collections of entities ("assets") that classify a collection of entities. Access to a repository system to perform actions with respect to an entity can be managed based on entitlements (e.g., a privilege) granting rights with respect to the entity itself and/or at least one asset having an association with the entity.

In certain embodiments, actions that can be performed on an entity can include creating an entity, reading an entity, updating an entity, deleting entity, or other actions that can be performed with respect to an entity. The repository system can manage access to one or more entities based on rights implied by entitlements to access one or more assets associated with those entities. An entitlement can indicate criteria corresponding to a type of access permitted for entities associated with an asset. For example, an entitlement can indicate the actions (e.g., create, read, update, or delete) that are permitted for an asset including the entities associated with the asset. In certain embodiments, a repository system can manage entitlements in one or more access policies. For example, when an access policy is applied to a composite asset, the entitlements indicated by the access policy can be implied for all entities included in that composite asset, such as composite services, composite applications, and components. Thus, entities associated with an asset may be subject to the entitlements that are applicable to the asset.

In certain embodiments, the repository system can use access policies to authorize access to the repository system by authenticated users. An authorized user of the repository system can be assigned to one or more roles (e.g., a developer, an architect, a leader, a tester, etc.) for operating the repository system. A user may be granted rights to access the system based on the role in which the user operates the system. The access policy can indicate criteria for one or more entitlements (e.g., privileges) granting access to one or more roles defined in the repository system. Each entitlement can indicate an asset to which access is permitted and the roles, which are permitted to access the asset. The entitlement can indicate the actions that are permitted for the asset. The repository system can permit access to perform the actions permitted on an asset by a user assigned to one of the roles indicated in the entitlement. In some embodiments, an entitlement can include a criterion indicating one or more entities corresponding to an object associated with an asset for which access is permitted.

By managing access to entities implied by access to assets in a repository system, performance of the repository system can be improved when determining access to information in a repository. For instance, processing can be dramatically reduced because access to entities can be implied based on assets associated with those entities, such that the repository system can reduce processing to determine access for each entity individually.

According to at least one example, techniques may be provided for managing access to an asset to control access to entities associated with the asset. Such techniques may be implemented by a computing system (e.g., a repository system). The computer system may include one or more processors and one or more memory devices coupled with and readable by one or more processors. The one or more memory devices may store a set of instructions that, when executed by the one or more processors, causes the one or more processors to perform the techniques disclosed herein. The techniques can include a computer-implemented method. The method can include receiving a request by a user to perform an action (e.g., create, read, update, or delete) on a first entity of a plurality of entities in a repository system. Each entity in the plurality of entities can have an association with at least one asset in the repository system. An entity may include information about an object stored in the repository system. The method can include determining, based on a role of a user associated with the user request, whether the user is entitled to access an asset associated with the first entity. The method may include determining a plurality of assets that a role of a user is entitled to access. The method may further include identifying, from the plurality of assets, an asset associated with the first entity. The method can include determining whether the requested action is a permitted action. The method can include, upon determining that the requested action is a permitted action, performing the requested action on the first entity. The method can include, upon determining that the requested action is not a permitted action, preventing the requested action from being performed on the first entity.

In certain embodiments, the method performed by the computing system may further include determining one or more assets accessible by the role of the user. The method may further include identifying one or more entities that have an association with the one or more assets accessible to the role. The user may be entitled to access the asset associated with the first entity based upon determining that the one or more identified entities includes the first entity.

In certain embodiments, where an action is to retrieve information associated with the first entity, preventing the requested action from being performed on the first entity includes preventing the requested information associated with the first entity from being provided to the user.

In certain embodiments, where a requested action is to modify information associated with the first entity, preventing the requested action from being performed includes preventing the information associated with the first entity from being modified according to the request.

In certain embodiments, where a requested action is to remove information associated with the first entity, preventing the requested action from being performed includes preventing the information associated with the first entity from being removed.

In certain embodiments, where a requested action is to create the first entity, preventing the requested action from being performed includes preventing the first entity from being created.

In certain embodiments, where a request includes a query, which includes criteria indicating entities to which the action is to be performed, a requested action is performed based on the criteria in the query.

In certain embodiments, the method performed by the computing system may further include determining one or more assets accessible by the role of the user and modifying the criteria of the query to include additional criteria that indicates the action is not to be performed for the entities not having an association with the one or more assets.

The following detailed description together with the accompanying drawings will provide a better understanding of the nature and advantages of embodiments of the present invention.

BRIEF DESCRIPTION OF THE DRAWINGS

FIG. 5 shows an access policy indicating criteria for an entitlement to access an asset according to an embodiment of the present invention.

DETAILED DESCRIPTION

Figure 1:
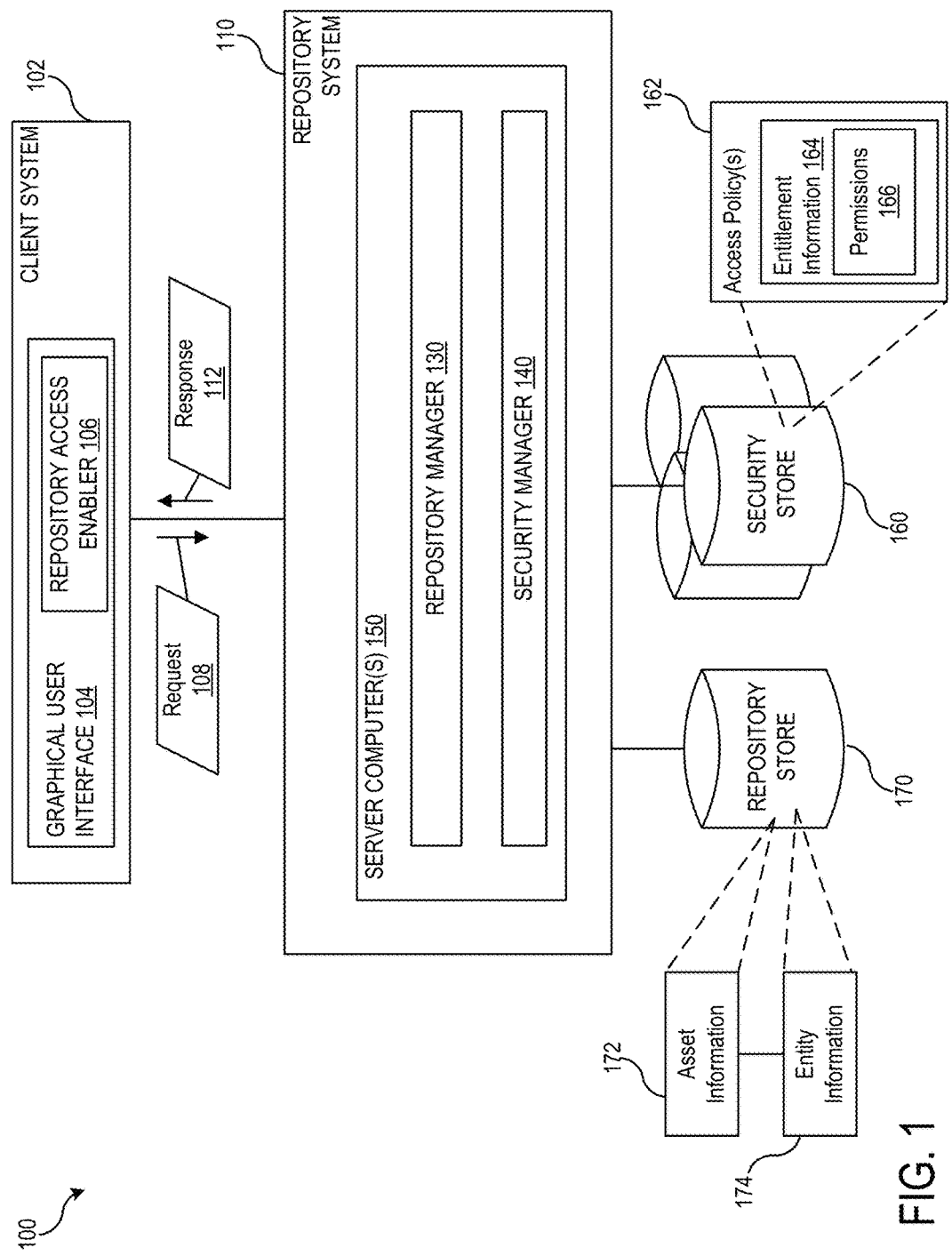
FIG. 1 shows a computing environment according to one embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

The present disclosure relates generally to techniques for managing access to a repository system for information (e.g., metadata) about objects in a computing environment. In certain embodiments, a computing environment can include many types of objects including an application, a process, a service, a method, or other object in a computing environment. The repository system can store a data structure (an "entity") that contains metadata about an object in a computing environment. An entity can have an association with one or more collections of entities ("assets") that classify a collection of entities. Access to a repository system to perform actions with respect to an entity can be managed based on entitlements (e.g., a privilege) granting rights with respect to the entity itself and/or at least one asset having an association with the entity.

In certain embodiments, actions that can be performed on an entity can include creating an entity, reading an entity, updating an entity, deleting entity, or other actions that can be performed with respect to an entity. The repository system can manage access to one or more entities based on rights implied by entitlements to access one or more assets associated with those entities. An entitlement can indicate criteria corresponding to a type of access permitted for entities associated with an asset. For example, an entitlement can indicate the actions (e.g., create, read, update, or delete) that are permitted for an asset including the entities associated with the asset. In certain embodiments, a repository system can manage entitlements in one or more access policies. For example, when an access policy is applied to a composite asset, the entitlements indicated by the access policy can be implied for all entities included in that composite asset, such as composite services, composite applications, and components. Thus, entities associated with an asset may be subject to the entitlements that are applicable to the asset.

In certain embodiments, the repository system can use access policies to authorize access to the repository system by authenticated users. An authorized user of the repository system can be assigned to one or more roles (e.g., a developer, an architect, a leader, a tester, etc.) for operating the repository system. A user may be granted rights to access the system based on the role in which the user operates the system. The access policy can indicate criteria for one or more entitlements (e.g., privileges) granting access to one or more roles defined in the repository system. Each entitlement can indicate an asset to which access is permitted and the roles, which are permitted to access the asset. The entitlement can indicate the actions that are permitted for the asset. The repository system can permit access to perform the actions permitted on an asset by a user assigned to one of the roles indicated in the entitlement. In some embodiments, an entitlement can include a criterion indicating one or more entities corresponding to an object associated with an asset for which access is permitted.

By managing access to entities implied by access to assets in a repository system, performance of the repository system can be improved when determining access to information in a repository. For instance, processing can be dramatically reduced because access to entities can be implied based on assets associated with those entities, such that the repository system can reduce processing to determine access for each entity individually.

FIG. 1 shows a computing environment 100 according to one embodiment of the present invention. Specifically, in the computing environment 100, access to assets managed by the repository store 170 may be determined. Access to an asset can be used to determine implied access to one or more entities having an association with the asset.

The computing environment 100 can include a client system 102, a repository system 110, and one or more data stores including a repository store 170 and a security store 160. The repository store 170 can store entity information 174 about each entity of a plurality of entities. An entity can be represented by a data structure that stores information (e.g., metadata) about an object in a computing environment. The data structure can include, without restriction, a linked list, a record, a hash table, or the like. An object can include an application, a process, a service, an endpoint device, a method, or other object in a computing environment. Information about an object can be stored in one or more entities. An entity can store information about one or more objects. The entity can include information such as a location of the object, an identifier of the object, a type of the object, and a relationship to other types of objects. The repository system 110 can store asset information 172 in the repository store 170. The asset information 172 can include information about each asset of a plurality of assets managed by the repository system 110. An asset can be represented by a data structure that stores information (e.g., metadata) about a collection of entities in a computing environment. Each entity can be stored in the repository data store 170 in association with at least one asset in the repository system. The repository system 110 can receive requests to access the information stored in the repository store 170. The repository system 110 can receive requests formatted according to a query language. The supported query languages can include Java Persistence API Query Language (JPQL), Apache Lucene®, a full text search language, or other types of query languages.

It should be appreciated that various different system configurations are possible, which may be different from the computing system 100. The embodiment shown in the figure is thus one example of a computing system for implementing an embodiment system and is not intended to be limiting. For purposes of illustration, specific embodiments are described herein for techniques for enabling a repository system (e.g., the repository system 110) determine access to an entity based on having an association with at least one asset that includes the entity.

In some embodiments, the client system 102 and the repository system 110 can be implemented in different computing systems or a single computing system. The client system 102 and the repository system 110 can communicate with each other via a network (not shown). Examples of communication networks can include the Internet, a mobile network, a wireless network, a cellular network, a local area network (LAN), a wide area network (WAN), other communication networks, or combinations thereof.

The security store 160 and/or the repository store 170 can be implemented using any type of persistent storage device, such as a memory storage device or other computer-readable storage medium. In a particular embodiment, one or more of data stores 160, 170 can be implemented using a database (e.g., a document database, a relational database, or other type of database), a file store, a lightweight directory access protocol (LDAP) implemented store, or a combination thereof.

The client system 102 (e.g., "a client") may be a computing system implemented in hardware, firmware, software, or combinations thereof, to enable a user to communicate with the repository system 110. A user can operate the client system 102 to communicate a request, e.g., a request 108, to the repository system 110 and receive responses (e.g., the response 112) from the repository system 110. The request 108 can indicate an action requested to be performed on information for one or more objects managed by the repository system 110. The actions can include creating an entity, reading an entity, updating an entity, or deleting an entity. In some embodiments, an action can be directed towards an entity, but may not change information stored for an entity corresponding to the object. In certain embodiments, the request 108 can be communicated by a user associated with a role for operating the repository system 110.

Examples of the client system 102 include an endpoint, a personal digital assistant (PDA), a tablet computer, a laptop computer, a desktop computer, a wearable computer, a pager, etc. The client system 102 can include one or more memory storage devices and one or more processors. A memory storage device can be accessible to the processor(s) and can include instructions stored thereon that, when executed by the processor(s), cause the processor(s) to implement one or more operations disclosed herein. In various embodiments, the client system 102 may be configured to execute and operate a client application such as a web browser, proprietary client applications, or the like. The client applications may be accessible or operated via one or more network(s). In some embodiments, the client system 102 can be associated with or implemented in the repository system 110.

In certain embodiments, the client system 102 can present a graphical user interface (GUI) 104 to facilitate communication with the repository system 110. The GUI 104 can include or implement a repository access enabler 106 to further assist the user in communicating the request 108 to the repository system 110. The repository access enabler 106 can present one or more GUIs that enable a user to include a criterion in the request 108 to indicate an action to be performed on particular assets and/or entities managed by the repository system 110. For example, the repository access enabler 106 can enable users to search, browse, view, or edit entities and/or assets under management of the repository system 110. The repository access enabler 106 may be configured to present information based stored by the repository system 110 for assets and/or entities. The repository access enabler 106 can present the response 112 when received from the repository system 110 in response to the request 108.

The client system 102 can access asset information 172 and/or entity information 174 from the repository system 110 based on a user's entitlement to access one or more assets in the repository system 110. The response 112 received by the client system 102 can include information stored in the repository store 170 as a result of performing the request action for the request 108. In certain embodiments, the response 112 can include information responsive to the request 108 to access a particular asset and/or an entity. In some embodiments, the response 112 can include a notification about the requested action 108. The notification can indicate why an asset and/or an entity could not be accessed by the user. The response 112 can include a portion of the entity information 174 requested if access is not permitted for all objects indicated in the request 108. In certain embodiments, the repository system 110 can provide one or more GUIs that can present the entity information 174 responsive to the request 108.

In certain embodiments, the client system 102 can enable a user (e.g., an administrator) to manage one or more access policies 162 used by the repository system 110 to manage access to the repository system 110. The GUI 104 can enable the user to specify a criterion for an access policy 162 including one or more entitlements for one or more roles for accessing the repository system 110. The GUI 104 can enable the user to administer management of users and roles for accessing the repository system 110. Details about access policies are described below with reference to FIGS. 1 and 3-5.

The repository system 110 can be implemented in hardware, firmware, software, or combinations thereof, to manage access to information stored in one or more data stores including the repository store 170 and the security store 160. The repository system 110 can be implemented with one or more server computers, e.g., a server computer 150, which can perform operations for the repository system 110. The server computer 150 can communicate with a client (e.g., the client system 102) to receive the requests 108 and to provide the responses 112.

In certain embodiments, the server computer 150 can include or can implement a web server computer (e.g., a web server). As a web server computer, the server computer 150 can support deployment of different types of applications to one or more client systems (e.g., the client system 102) in a distributed manner. For example, the server computer 150 can support the execution of one or more applications, which can be accessed by one or more client systems, e.g., the client system 102. The applications can be provided to the client system 102 to enable a user to operate the repository system 110. The one or more applications can be accessed and operated via the GUI 104. In certain embodiments, the server computer 150 can exchange communication with the client system 102 to provide on or more services to the client system 102.

The server computer 150 can include or implement a repository manager 130 to manage information (e.g., the entity information 174 and the asset information 172) in the repository store 170. In certain embodiments, the entity information 174 and the asset information 172 can be managed in the repository store 170 based on a hierarchical metadata model derived from one or more formalized metadata models. The entity information 174 (e.g., metadata) can correspond to information for one or more entities. The repository manager 130 can generate the entity information 174 as one or more entities are created for objects that are identified in a computing environment. In certain embodiments, the repository manager 130 can generate the entity information 174 based on information about objects provided by a user via the client system 102. The repository manager 130 can store the asset information 172, which includes information about one or more assets in a computing environment.

The repository manager 130 can process the requests 108 for the repository system 110. The repository manager 130 can perform operations to access the repository store 170 based on an action indicated by the request 108. For example, when the request 108 is to read the entity information 174 for one or more entities, the repository manager 130 can retrieve the entity information 174 for the entity and send the response 112 with the entity information 174. In another example, when the requested action is modifying an entity, the repository manager 130 can locate the entity information 174 for the entity and perform the request action on the entity. However, the repository manager 130 may determine a user's entitlement to access the repository system 110 before processing the request 108.

The server computer 150 can include or implement a security manager 140 to determine authentication of a user access the repository system 110 by users. The security manager 140 can permit access to an individual user based on association with one or more access groups. A user or a group of users may be granted authorization based on one or more roles (e.g., a developer, an architect, a leader, a tester, etc.) for operating the repository system 110. A user may be granted rights to access the system based on the role in which the user operates the repository system 110. Access to the entity information 174 and the asset information 172 can be based on the authorization granted to each user.

The security manager 140 can manage one or more access policies 162 to determine access to the repository system 110 by an individual or group of individual. The access policies 162 can be created and/or managed via the GUI 104 at the client system 102. The access policy 162 can include entitlement information 164 indicating a criterion for one or more entitlements (e.g., privileges) to access the repository system 110. Each entitlement can indicate a right granted (e.g., a privilege) to access to one or more roles defined in the repository system 110. Each entitlement can indicate permissions 166 as to which roles which are permitted to access the asset. The permissions 166 can indicate the actions that are permitted for the asset. The security manager 140 can permit access to perform any of the actions permitted on an asset by a user assigned to one of the roles indicated by the entitlement. The security manager 140 can permit access to entities having an association with an asset for which access is permitted according to an entitlement applicable to a user. In some embodiments, an entitlement can include a criterion indicating particular entities corresponding to an object that may be permitted to be accessed from the asset.

Figure 2:
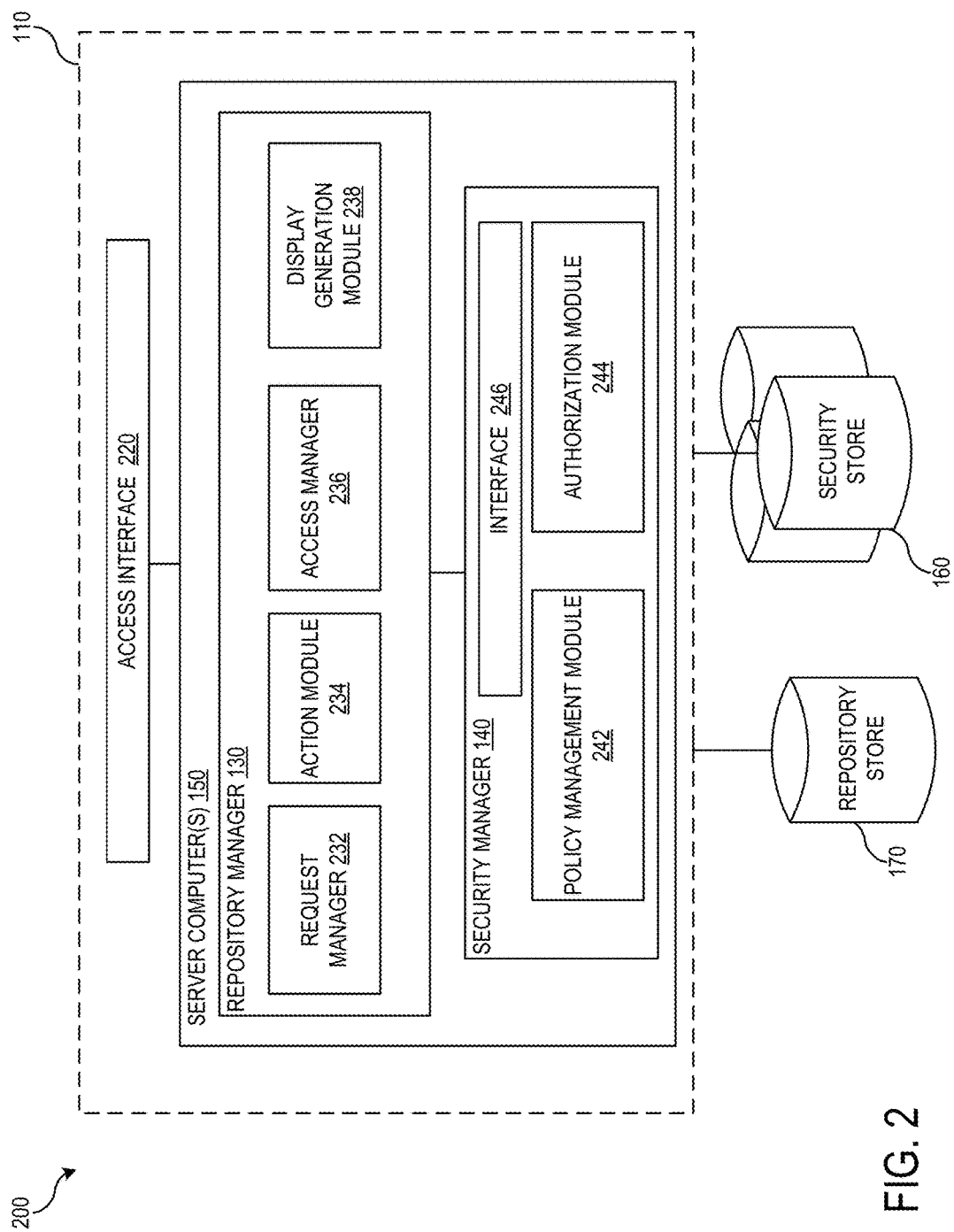
FIG. 2 shows a repository system according to one embodiment of the present invention.

FIG. 2 shows a repository system 110 of FIG. 1 according to one embodiment of the present invention. The repository system 110 can include like elements of FIG. 1 represented by like reference numbers and designations. The repository system 110 can include the access interface 220 and the server computer 150. The repository system 110 can be coupled to the security store 160 and the repository store 170.

As explained above, the repository system 110 can manage access to information stored in the repository store 170. A user of the client system 102 can send a request (e.g., the request 108) to the repository system 110 to perform an action on one or more entities managed by the repository system. The repository system 110 can determine entitlements granted to the user based on the user's role and can perform the requested action based on the rights permitted to the user according to the granted entitlements. The repository system 110 can provide the response 112 to the client system 102 indicating a result of the requested action and the entity information 174 that is accessible if requested for the action.

In some embodiments, the repository system 110 can include or implement an access interface 220. The access interface 220 can facilitate communication between the client system 102 and the repository system 110. The access interface 220 can include one or more callable interfaces (e.g., an application programming interface) that enable the client system 102 to communicate with the repository system 110. The request 108 and the response 112 can be communicated via the access interface 220.

The repository system 110 can be implemented as one or more functional blocks or modules configured to perform various operations for the requests 108 received by the server computer 150. The function blocks or modules can be configured to perform functions related to accessing the repository 170 or functions related to the security store 160. The repository manager 130 can include a request manager 232, an action module 234, an access manager 236, and a display generation module 238.

The display generation module 238 can generate one or more GUIs for display by a client system (e.g., the client system 102). All or a portion of the GUI 104 can be generated by the display generation module 238. A GUI generated by the display generation module 238 can be provided to the client system 102 in the response 112. A display provided by the repository access enabler 106 can be generated by the display generation module 238. The display generation module 238 can generate a display (e.g., a GUI) to present the results of the action(s) performed for the request 108. In some embodiments, the GUI can include a notification indicating a result of performing the action(s) for the request 108.

In certain embodiments, the display generation module 238 can generate a display providing the asset information 172 and/or the entity information 174 that is accessible by a user that accesses the repository system 110. The display can provide the user with assets that are accessible and the actions that are permitted on those assets. The display can provide the user with options for selecting entities that are accessible based on access implied by the assets that are accessible to the user.

The request manager 232 can receive the request 108 from the client system 102 via the access interface 220. The request manager 232 can process the request 108 to determine action(s) requested and the entity information 172 and/or the asset information 174 being requested for each action. Upon determining the criterion in the request 108, the request manager 232 can provide the criterion indicated in the request 108 to the access manager 236 to determine whether a user associated with the request 108 is entitled to perform the requested action(s) in the request 108. In some embodiments, the criterion can include or can be specified according to a query indicating the entities for which the request action is to be performed. The query can be specified according to a query language (e.g., JPQL or Apache Lucene®) supported by the repository system 110.

The access manager 236 can determine authorization for the user to make the request 108. The access manager 236 can communicate with the security manager 140 to determine authorization for the action(s) indicated in the request 108. To determine authorization, the security manager 140 can be requested to determine the assets for which the user is entitled to access based on the role of the user. In some embodiments, the access manager 236 can determine one or more assets from the asset information 172 that are associated with each of the types of entities indicated in the request 108. The identified assets can be provided to the security manager 140 to determine access to the assets based on the role of the user. In some embodiments, the access manager 236 can request the security manager 140 to determine the entitlement of the role based on the types of entities identified for each action indicated in the request 108.

The access manager 236 can receive information from the security manager 140 indicating the assets that the role is entitled to access. The information from security manager 140 can include the actions permitted for the assets to which the role is entitled to access. In some embodiments, the information received from the security manager 140 can indicate the entities of the assets that are accessible to the role. The information received from the security manager 140 can indicate one or more obligations that indicate restrictions for accessing particular entities associated with an asset that a role is entitled to access. In some embodiments, the access manager 232 can receive information from the security manager 140 indicating an error or notification that the role is not authorized to access all or a portion of assets associated with one or more entities indicated in the request 108.

Based on the entitlements granted to the role of the user associated with the request 108, the access manager 236 can determine whether the role of the user is permitted to access each entity identified in the request 108. The access manager 236 can retrieve from the repository store 170 the entity information 174 to identify each entity having an association with one or more of the assets to which the role is entitled to access. With the exception of entities for which an obligation is defined in an entitlement, the role of the user can be granted an entitlement which provides an implied access to any of the entities having an association with one or more of the assets the role is entitled to access. The access manager 236 can determine whether any of the entities corresponding to an action in the request 108 are included in the identified entities that have an association with one or more of the assets the role is entitled to access.

Based upon the authorization received from the access manager 236, the request manager 232 can instruct the action module 234 to perform the action(s) for which the user is entitled to perform for the entities indicated by the request 108. The access manager 236 can determine actions the role is entitled to perform based on the entities the role is entitled to access. When requesting the action module 234 to perform actions for the request 108, the request manager 232 can indicate the actions to be prevented from being performed for each entity that the role is not entitled to access. When the action to be prevented is a read action for a particular entity, the access manager 236 can indicate to the request manager 232 to prevent the information for the particular entity from being provided to the client system 102 to be presented to the user. When the action to be prevented is an action to create an entity, the access manager 236 can indicate to the request manager 232 to prevent the entity from being created. When the action (e.g., modify or delete) to be prevented is to be performed on an existing entity, the access manager 236 can indicate to the request manager 232 to prevent the action from being performed.

In some embodiments, the request manager 232 can instruct the action module 234 to perform one or more actions for the request 108 based on a query. The request manager 232 can generate a query that indicates the actions for entities a user associated with the request 108 are entitled to perform. In certain embodiments, the query can be generated using a full-text search language (e.g., Apache Lucene®), JPQL, or other query language. The query can also be based on a query (e.g., a JPQL query) indicated in the request 108. In some embodiments, the request manager 232 can modify the received query based on entities the role of the user is entitled to access. For example, the request manager 232 can modify a query indicated in the request 108 to prevent entities that are not entitled to access from being requested from the repository system 110. The query can be modified by to include an additional criterion that indicate the assets the user is permitted to access. The query indicated in the request 108 can be modified to include a criterion indicating the actions that can be performed on entities the role of the user is entitled to access. In some embodiments, when the action indicated in the request is an action other than a read action, the query can be modified to include information (e.g., an identifier of an entity) about each entity the user is permitted to access based on the entitlements to the role of the user.

In certain embodiments, the request manager 232 can modify the query to include a negative criterion or conditions indicating entities, assets, actions, or a combination thereof that are to be excluded when actions are performed for the query. For example, the query in the request 108 can be modified to indicate the entities in the query on which the user is not entitled to access so as to prevent the action module from performing actions for entities the role is not entitled to access. For example, the query can be modified to indicate the actions that are not to be performed for the entities that do not have an association with the one or more assets the role is entitled to access.

The action module 234 can access (e.g., query, retrieve, store, etc.) the repository store 170 on behalf of the repository system 110. In particular, the action module 234 can perform one or more actions indicated by the request manager 232. The action module 234 can receive a criterion from the request manager 232 indicating the actions requested for the entities which the user is permitted to access. Upon determining results of the action(s) performed, the action module 234 can provide the results to the request manager 232. Alternatively or additionally, the results can be provided to the display generation module 238 to generate a display of the results.

The security manager 140 can perform authentication of users of the repository system 110. The security manager 140 can manage security based on a security model that determines authorization to access based on authenticated users. A user can be identified by a username. The user must present appropriate credentials to be authenticated by the security manager 140. A user can be assigned to one or more roles and those roles are assigned to entitlements before one or more the entity information 174 for objects can be accessed. The security manager 140 can manage entitlements for access to the information stored in the repository store 170. The access policies 162 managed by the security manager 140 can be stored in the security store 170.

The security manager 140 can be implemented as one or more functional blocks or modules configured to perform various operations for determining authorization to access information stored by the repository system 110. The function blocks or modules can be configured to perform functions related to determining access to the repository 170 or functions related to obtaining information from the security store 160. The security manager 140 can include a policy management module 242 and an authorization module 244. In certain embodiments, the security manager 140 can include an interface 246 (e.g., an application programming interface) to enable access to functions provided by the security manager 140. The interface 246 can enable the security manager 140 to receive requests to perform authentication of a user and the user's requests.

The policy management module 242 can manage the access policies 162 stored in the security store 160. Through the interface 246, the policy management module 242 can receive requests to manage (e.g., create, read, update, and delete) an access policy. The policy management module 242 can perform the requests to obtain information (e.g., the entitlement information 164) from the access policy 162. The policy management module 242 can determine entitlements that are applicable to a role of a user. The requests can include a criterion to include in an access policy 162. The policy management module 242 can update or create an access policy based on the criterion. An example of an access policy is described below with reference to FIGS. 3 and 5.

The authorization module 244 can determine authorization for a user to access the repository system 110. Via the interface 246, the authorization module 244 can receive requests from the repository manager 130 to determine authorization for a role of the user to access one or more entities. A request can include information such as the role of the user, the types of entities requested for access, the actions requested to be performed on those entities, or a combination thereof. In some embodiments, the request can include the assets associated with the types of entities indicated in the request 108.

The authorization module 244 can communicate with the policy management module 242 to determine entitlements for the role of the user for the requested action(s). Based on the entitlement information 162, the authorization module 244 can determine the assets accessible to the role for the user. The assets accessible to the user can be used to imply access to types of entities having an association with those assets. In some embodiments, the authorization module 244 can determine whether one or more of the types of entities indicated in the request 108 have an association with at least one asset identified in an entitlement for the role. The authorization module 244 can determine the obligations for the role. The obligations can indicate the actions that the user is entitled to perform for the types of entities requested by the user. The obligations can also indicate all types of entities that can be accessed by the role and the actions that are permitted for each of the types of entities.

The authorization module 244 can provide the repository manager 130 with a response indicating the obligations for the role including the actions permitted for the entities requested by the user. In some embodiments, the authorization module 244 can provide the repository manager 130 with the entitlement information, including the assets that are accessible to the role of the user in response to a request for authorization. In such embodiments, the authorization module 244 can indicate the assets that are permitted to be access for specific type of entities requested by the user and the actions that can be performed with respect to those permitted assets.

By managing entitlements to access information in a repository based on access to a group of objects, a repository system can reduce processing time to determine specific objects that a user with a role is permitted to act upon. Grouping information about objects into a collection enables an administrator to control access to groups of objects that certain types of roles can access. Therefore, in a repository system having many objects, managing objects in a group of objects rather than each object individually can ease efforts for managing administration by permitting access to be managed more easily in a coarse grained manner with respect to a group of objects. However, the repository system can easily manage access to objects individually based on entitlements that are defined with respect to a group of objects, such that the repository system can determine implied access to objects based on the group.

Figure 3:
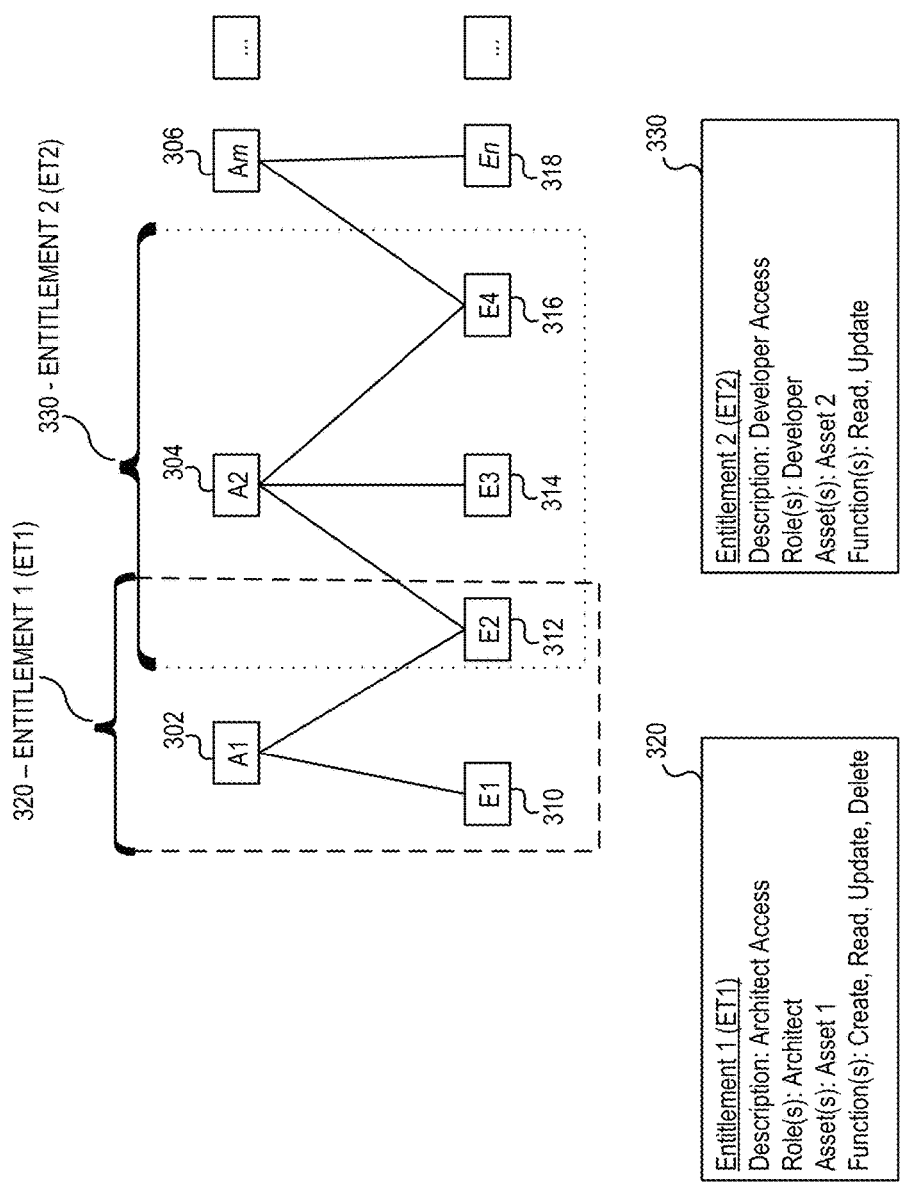
FIG. 3 shows a diagram illustrating a relationship of entitlements to assets associated with entities according to an embodiment of the present invention.
Figure 4:
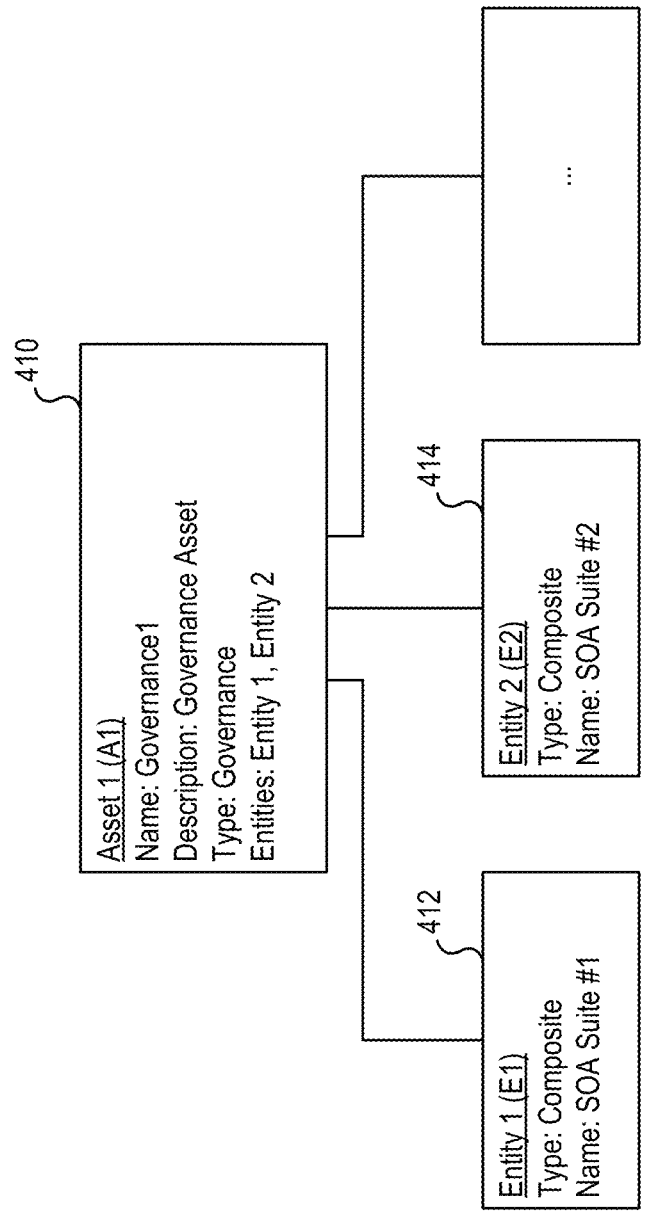
FIG. 4 shows data structures of an asset and entities associated with an asset according to an embodiment of the present invention.

The following FIGS. 3-5 show examples of information that can be managed by a repository system to determine entitlements to access entities stored in the repository system. Specifically, FIGS. 3 and 5 show how entitlements are managed based on the assets that have an association with entities. In FIG. 3, a diagram is shown illustrating a relationship of entitlements to assets associated with entities according to an embodiment of the present invention. In particular, FIG. 3 shows a relationship between assets and entities in a repository system (e.g., the repository system 110). One or more entities have an association with at least one asset in a repository system. An entitlement applicable to an asset can be implied to one or more entities associated with the asset.

FIG. 3 shows a plurality of entities having a number (n) of entities that can be stored by a repository system. For example, FIG. 3 shows an entity (E1) 310, an entity (E2) 312, an entity (E3) 314, an entity (E4) 316, and an entity (En) 318. FIG. 3 shows a plurality of assets having a number (m) of assets that are stored by the repository system. For example, FIG. 3 shows an asset (A1) 302, an asset (A2) 304, and an asset (Am) 306. Each of the assets A1 302-Am 306 can be stored in association with at least one of the entities E1 310-En 318. A1 302 can be associated with E1 310 and E2 312. A2 304 can be associated with E2 312-E4 316. Am 306 can be associated with E4 316 and En 318. Each of the entities E1 310-En 318 can have an association with at least one asset.

An entitlement granted to a role for access to an asset can be used to manage access to entities having an association with the asset. This technique can reduce an amount of processing performed by a repository system to determine access to individual entities by determining access to an entity based on one or more entitlements to access an asset associated with the entity. FIG. 3 illustrates different entitlements that can be defined for an asset which are implied to the entities included in the asset.

In one example shown in FIG. 3, a first entitlement (ET1) 320 can grant access to A1 302 for an architect role. ET1 320 can imply an entitlement to access the entities E1 310 and E2 312 having an association with A1 302. In FIG. 3, an entitlement can include information indicating one or more roles to which the entitlement is granted, the asset(s) for which the entitlement is granted, functions that are permitted for the entitlement, or a combination thereof. For example, ET1 320 can be defined for an architect role's access to the repository system, such that a user accessing the repository system in an architect role can perform functions including create, read, update, and delete for an asset, A1 302. In a second example shown in FIG. 3, a second entitlement (ET2) 330 can be granted for A2 304. ET2 330 can imply an entitlement to access the entities E2 312-E4 316 having an association with A2 304. ET2 330 can be defined for an developer's access to the repository system, such that a user accessing the repository system in a developer role can perform functions including read and update for E2 304.

By managing access to entities based on one or more assets associated with the entity, a user can access an entity to perform different actions when the user is entitled to access the asset under a specific role. In a repository system having a large number of entities, managing access based on assets can reduce a burden on the repository system to determine access to individual entities. Access to objects implied based on access to an asset can enable the repository system to quickly implement change for access given to a role such that entities can be removed from having an association with an asset or access can be modified for an asset to imply changes to entities associated with the asset.

FIG. 4 shows data structures of an asset and entities associated with an asset according to an embodiment of the present invention. FIG. 4 shows an example of a data structure of an asset 410 that can be stored in a repository store (e.g., the repository store 170) by a repository system (e.g., the repository system 110). The A1 410 can include information identifying the asset such as a name of the asset (e.g., Governance), a type of the asset (e.g., a Governance Asset), and a description of the asset (e.g., Governance Asset). The A1 410 can include information identifying one or more entities associated with the A1 410. For example, A1 410 can be associated with an entity (E1) 412 and an entity (E2) 414. A data structure of an asset can include other information such as attributes that define the asset.

FIG. 4 shows an example of a data structure for E1 412 and E2 414. A data structure of an entity can include information identifying the entity such as a name of an entity, the type of the entity, a description of the entity, and/or other attributes of the entity. An entity can include information indicating one or more assets to which the entity has an association. An entity can include information indicating a relationship with other entities. E1 412 includes a type of the entity (e.g., Composite) and a name of the entity (e.g., SOA Suite #1). E2 includes a type of the entity (e.g., Composite) and a name of the entity (e.g., SOA Suite #2).

FIG. 5 shows an access policy 500 indicating a criterion for an entitlement to access an asset (e.g., A1 410 of FIG. 4) according to an embodiment of the present invention. Although the access policy 500 is shown in one format as an example, it should be appreciated that various different formats are conceivable, which may be different from the access policy 500 as shown in FIG. 5. In FIG. 5, the access policy 500 is shown in an Extended Markup Language (XML) format. As explained above, the criterion defining the access policy 500 can be provided to the repository system by a user (e.g., an administrator). The access policy 500 can be stored in the security store 160 and managed by the repository system 110. The access policy 500 is shown with entitlement information (e.g., the entitlement information 164) about an entitlement for a role. The access policy 500 can include one or more entitlements corresponding to one or more roles for accessing the repository system 110. In certain embodiments, multiple access policies can be created, each for a different role, a different entitlement, another criterion for an entitlement, or a combination thereof.

The access policy 500 can include information indicating an entitlement for particular entity types that are governed by an asset. For example, the access policy 500 can identify an asset (e.g., "Governance Asset") 510 that is stored in the repository store 170. The access policy 500 can indicate an entitlement for the asset 510. Actions 520 in the entitlement are those which are permitted for the asset 510. For example the action 520 can include a create action and a delete action. The access policy 500 can indicate one or more roles 530, such as an architect role, each of which can be entitled to perform the actions 520.

In some embodiments, the access policy 500 can include one or more obligations, such as an obligation 540 and an obligation 550. An obligation can indicate one or more entities that have a constraint for their access besides the access implied by the asset. An obligation can include a criterion indicating a restriction for accessing a particular entity in the asset corresponding to the entitlement. In FIG. 5, the obligation 540 specifically indicates that an asset, e.g., a composite application "SOA Suite #1," is permitted for the actions entitled to the architect role. Similarly, the obligation 550 specifically indicates that an asset, e.g., a composite application "SOA Suite #2," is permitted for the actions entitled to the architect role. Thus, an entitlement can provide a criterion to control access with respect to entities in an entitlement. As explained above, the security manager 140 of FIG. 1 can provide these obligations to the repository manager 130 to enable the repository manager 130 to further determine whether an action requested by a user is permitted for an entity.

Figure 6:
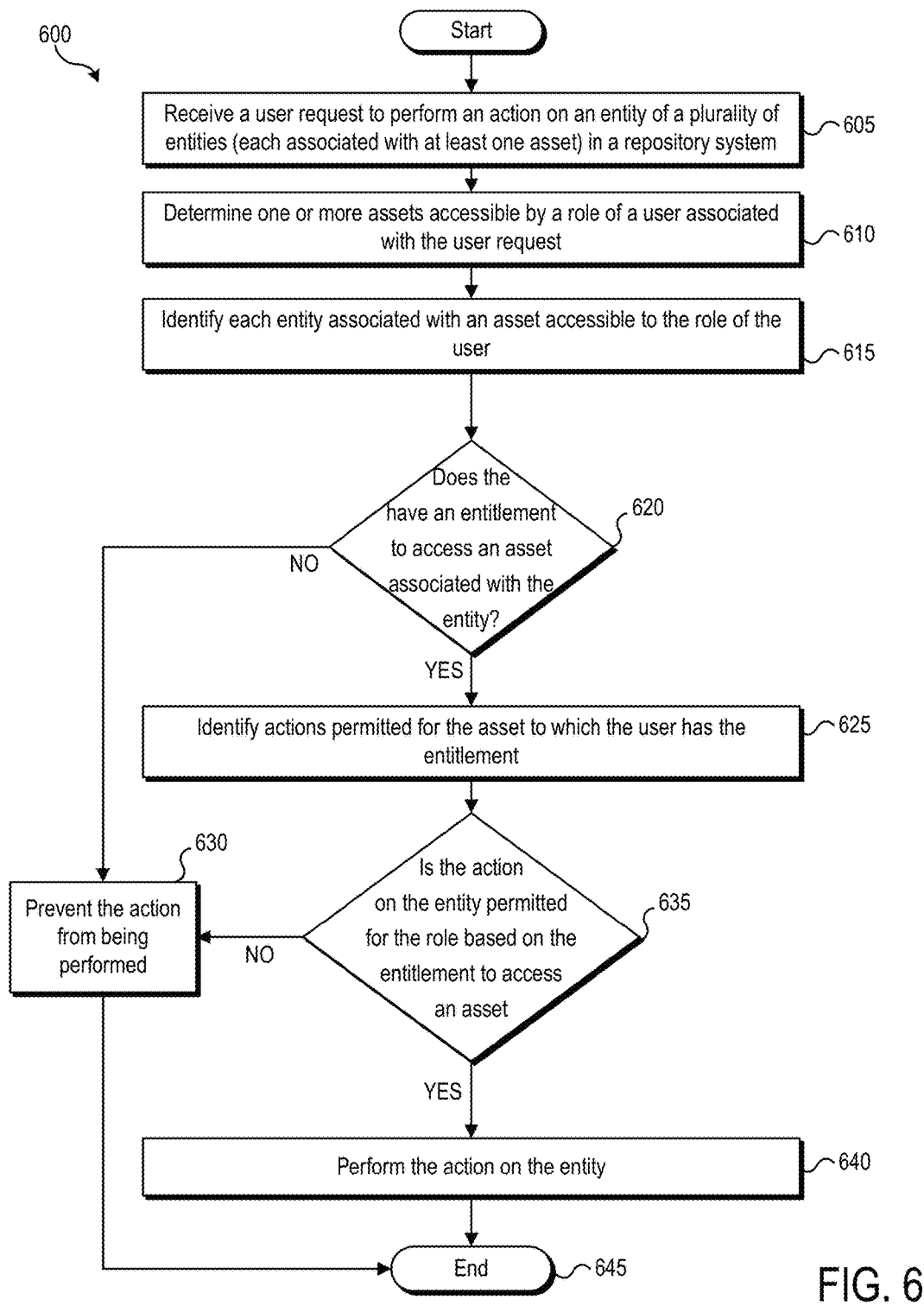
FIG. 6 is a flowchart illustrating a process for managing access to an entity implied by access to an asset associated with the entity an embodiment of the present invention.

FIG. 6 shows a flowchart a process 600 for a process for managing access to an entity implied by access to an asset associated with the entity according to an embodiment of the present invention. The process 600 enables a repository system to determine whether a user is permitted to perform an action on an entity in a repository system based on a role associated with the user. Specifically, the process 600 enables a repository system to determine whether an entitlement for a role to access one or more assets implies a right to a user in the role to perform an action on an entity associated with one of the assets.

The process 600 can begin at block 605 by receiving a request by a user to perform an action on an entity of a plurality of entities in a repository system. The user can be associated with a role when accessing the repository system. For example, a user with a role of an architect can make a request to perform an update on a composite application, such as an SOA Suite Application, for which an entity is stored in the repository system. Each entity in the repository system can be associated with at least one asset in the repository system. An entity can include information about an object stored in the repository system.

At block 610, the process 600 can determine one or more assets accessible by a role of a user associated with the user request. For example, the access policy 500 of FIG. 5 can be used to determine access to the repository system for one or more assets accessible to an architect role of the user. Using the access policy 500, the repository system can identify assets, such as a governance asset ("Governance#1"), which are accessible by the architect role.

At block 615, the process 600 can identify each entity associated with an asset accessible to the role. For example, a security policy (e.g., the access policy 500) can further identify each entity that can be accessed for an asset, e.g., the governance asset, which is accessible to the architect role of the user. In the previous example of the access policy 500, the repository system can identify an entity corresponding to a first composite application ("soasuite#1:Composite") and an entity corresponding to a second composite application ("soasuite#2:Composite"), both of which are associated with the governance asset accessible to the architect role.

At block 620, the process 600 can determine, based on a role of the user associated with the user request, whether the user has an entitlement to access an asset associated with the entity for the requested action. Upon determining that the user is does not have an entitlement to access an asset associated with the entity, then process 600 can proceed to block 630. Upon determining that the user has an entitlement to access an asset associated with the entity for the requested action, the process 600 can proceed to block 625.

Continuing from the previous example, the repository system can determine, based on the user having an architect role, that the user has the entitlement to access a governance asset. Based on the access policy 500, the governance asset is associated with an entity corresponding to a SOA composite application, such as a first composite application ("soasuite#1:Composite") and a second composite application ("soasuite#2:Composite"). In this example, the process 600 proceeds to block 625 because the governance asset is associated with an SOA composite application for which the action is requested.

At block 625, the process 600 can identify one or more actions that are permitted for the role based on the entitlement to access the asset. The repository system can analyze a access policy to identify the actions that are permitted for the asset accessible to the user based on the role. For example, the access policy 500 can be used to identify a create action and a delete action, both of which are permitted to be performed by the architect role on the governance asset.

Now returning to block 620, upon determining that the user is does not have an entitlement to access an asset associated with the entity for the requested action, then process 600 can proceed to block 630. At block 630, the process 600 can prevent the requested action from being performed because the user does not have an entitlement to access an asset association with the entity for the requested action. For example, based on the access policy 500, the repository system can prevent performing actions, such as a read action or an update action, which are not permitted by the architect role on entities having an association with the governance asset. In some embodiments, upon determining that the requested action is a read action, the process 600 can prevent the entity for the requested action from being accessed and retrieved. The user is prevented from viewing information associated with the requested entity because the requested entity cannot be accessed by the architect role. In some embodiments, upon determining that the requested action is an update action, the process 600 can prevent an update from being performed on the entity for the requested action. Similarly, in certain embodiments, the process 600 can prevent other unpermitted actions, such as create and delete, from being performed when any or all of these actions are not permitted based on the role of the user. The process 600 can proceed to end at block 645.

After completion of block 625, at block 635, the process 600 can determine whether the one or more permitted actions includes the requested action. The requested action to be performed on the entity can be permitted upon determining that the requested action is a permitted action for the role. Upon determining that the requested action is not one of the permitted actions, the process 600 proceeds to block 630 to prevent the requested action from being performed and then can proceed to block 645 where the process 600 ends. Upon determining that the one or more permitted actions includes the requested action, the process 600 proceeds to block 640 to perform the requested action.

At block 640, the process 600 can perform the requested action upon determining that the requested action is a permitted action. The process 600 can proceed to end at block 645.

In certain embodiments, the process 600 can be implemented by certain embodiments of the repository system 110 of FIG. 1. The repository system 110 can receive the request 108, from the client system 102, to perform an action on entity (e.g., the entity information) stored by the repository system 110. Using one or more access policies 162, the repository system 110 can determine one or more assets in the asset information 172 that are accessible by a role of a user that made the request 108. The repository system 110 can identify each entity associated with the assets accessible to the role of the user. Upon determining that the entity indicated in the request 108 is included in one of the assets accessible to the role of the user, then the repository system 110 can determine, based on the entitlement information 164 in an access policy applicable to the role, the actions permitted for one or more assets that include the entity. If one of the actions is an action indicated in the request 108, then the repository system 108 can perform the action. Otherwise, the repository system will prevent the action for the request 108 from being performed.

Process 600 can be performed in an iterative manner for each action requested to be performed on one or more entities in a repository system (e.g., the repository system 110). Alternatively or additionally, blocks 620-640 can be performed for each action requested to be perform for an entity. In certain embodiments, the action performed on an entity at block 640 can vary based on the assets that include the entity and the actions the user is permitted to perform with respect to each asset associated with the entity. While one action may not be permitted for an asset associated with the entity, the action may be permitted for a different asset associated with the entity.

It will be appreciated that process 600 is illustrative and that variations and modifications are possible. Action or operations described for process 600 as sequential may be executed in parallel and/or order of operations may be varied, and operations may be modified, combined, added or omitted.

Figure 7:
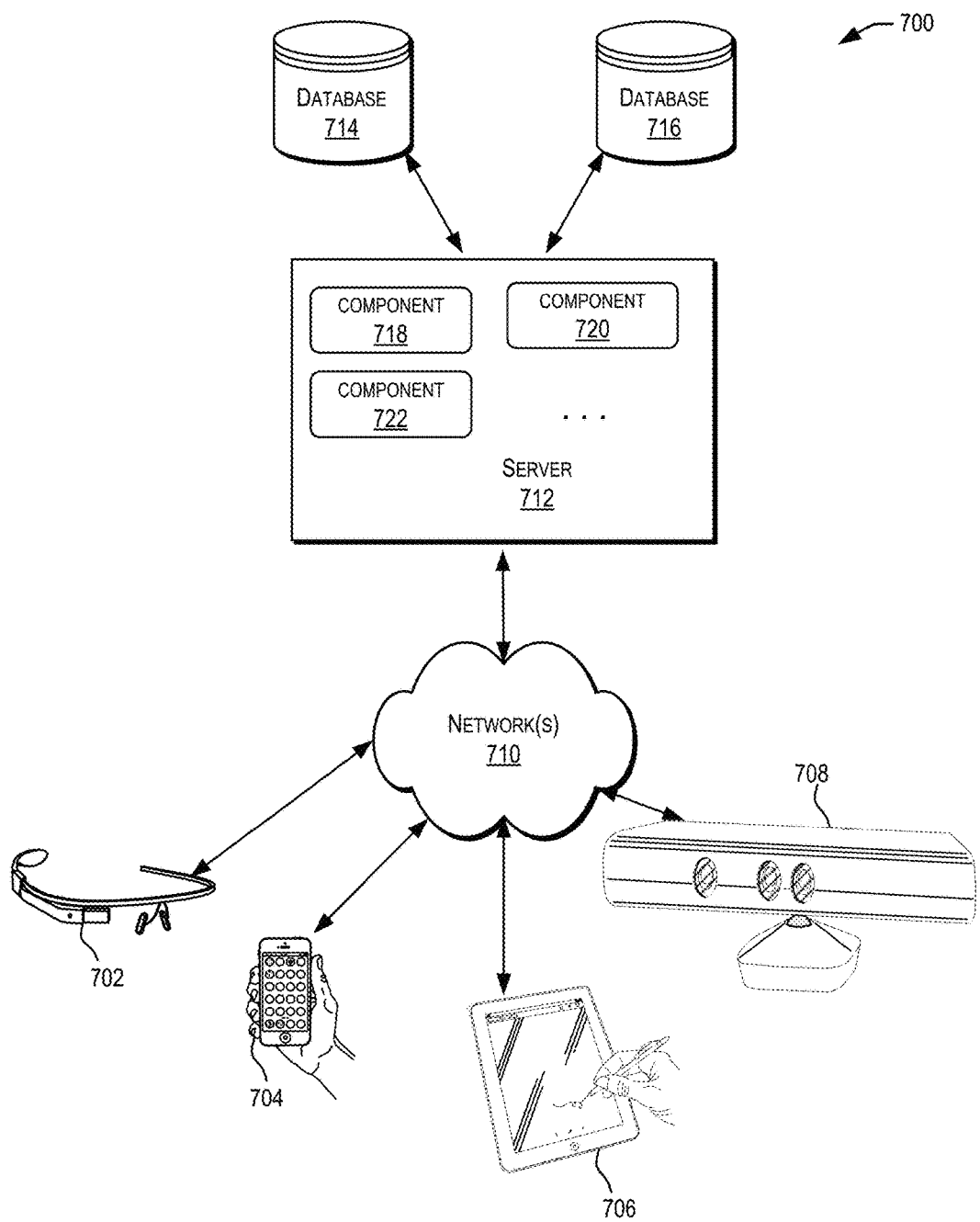
FIG. 7 depicts a simplified diagram of a distributed system for implementing one of the embodiments.

FIG. 7 depicts a simplified diagram of a distributed system 700 for implementing one of the embodiments. The distributed system 700 can implement the computing environment 100 of FIG. 1, the repository system 110, and/or the client system 102. The distributed system 700 can implement the process 600 of FIG. 6. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. In certain embodiments, the one or more client computing devices 702-708 can include the client system 102 of FIG. 1. Server 712 may be communicatively coupled with remote client computing devices 702, 704, 706, and 708 via network 710. The server 712 can include the repository system 110 of FIG. 1.

In various embodiments, server 712 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization. One or more flexible pools of logical storage devices can be virtualized to maintain virtual storage devices for the server. Virtual networks can be controlled by server 712 using software defined networking. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP servers, FTP servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands. The security store 160 of FIG. 1 and/or the repository store 170 of FIG. 1 can be included in the one or more databases 714 and 716.

Figure 8:
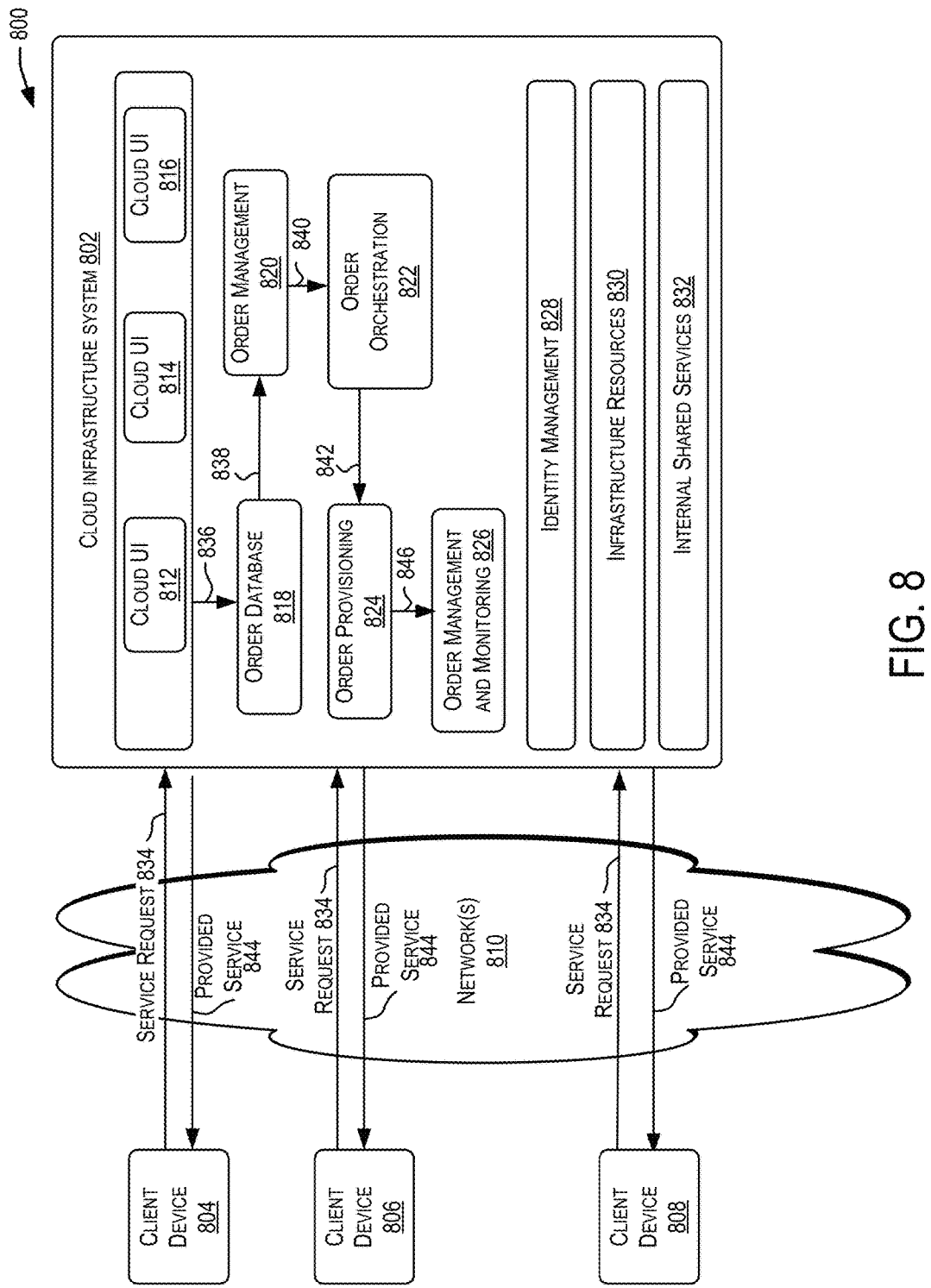
FIG. 8 is a simplified block diagram of components of a system environment by which services provided by the components of an embodiment system may be offered as cloud services, in accordance with an embodiment of the present disclosure.

FIG. 8 is a simplified block diagram of one or more components of a system environment 800 by which services provided by one or more components of an embodiment system may be offered as cloud services, in accordance with an embodiment of the present disclosure. The system environment 800 can include or implement the computing environment 100 of FIG. 1, the repository system 110, and/or the client system 102. The system environment 800 can implement the process 600 of FIG. 6. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. For example, the cloud infrastructure system 802 can include or implement the repository system 110 of FIGS. 1 and 2. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

Cloud infrastructure system 802 may comprise one or more computers and/or servers that may include those described above for server 712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Large volumes of data, sometimes referred to as big data, can be hosted and/or manipulated by the infrastructure system on many levels and at different scales. Such data can include data sets that are so large and complex that it can be difficult to process using typical database management tools or traditional data processing applications. For example, terabytes of data may be difficult to store, retrieve, and process using personal computers or their rack-based counterparts. Such sizes of data can be difficult to work with using most current relational database management systems and desktop statistics and visualization packages. They can require massively parallel processing software running thousands of server computers, beyond the structure of commonly used software tools, to capture, curate, manage, and process the data within a tolerable elapsed time.

Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
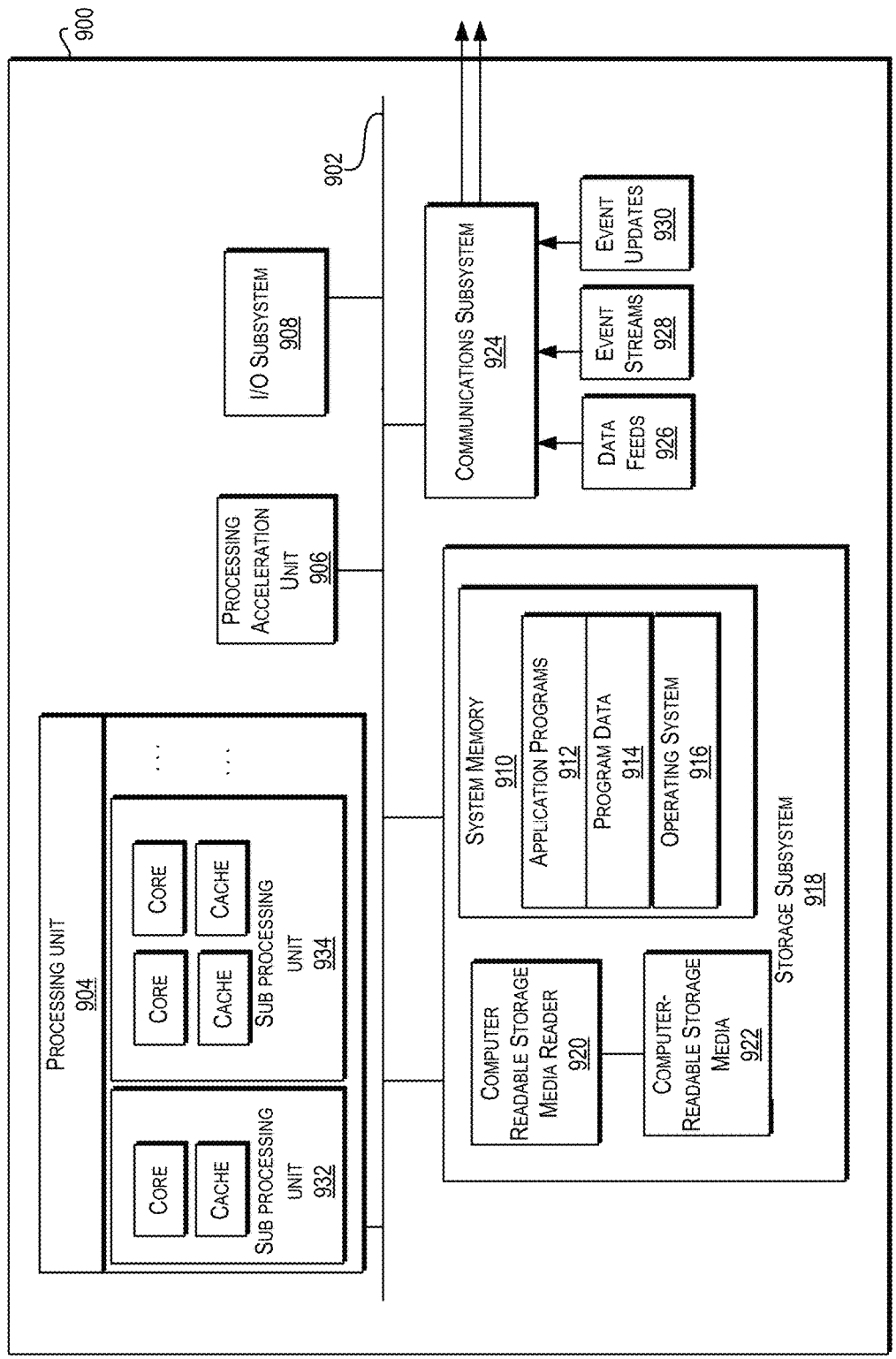
FIG. 9 illustrates an exemplary computer system, in which various embodiments of the present invention may be implemented.

FIG. 9 illustrates an exemplary computer system 900, in which various embodiments of the present invention may be implemented. The system 900 may be used to implement any of the computer systems described above. For example, all or some of the elements of the computing environment 100 of FIG. 1, the repository system 110, and/or the client system 102 can be included or implemented in the system 900. The system 900 can implement the process 600 of FIG. 6. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving, by a computer system, a query indicating a first entity, a second entity, and an action to be performed on the first entity and the second entity, wherein the first entity and the second entity are stored by a repository system;
   determining, by the computer system, a user role associated with the query;
   determining, by the computer system, that the first entity is associated with a first asset stored in the repository system;
   determining, by the computer system, an entitlement associated with the first asset;
   determining, by the computer system and based upon the entitlement associated with the first asset, that the action is permitted for the user role for the first asset, thereby implying that the user role is permitted to perform the action on the first entity due to the first entity being associated with the first asset;
   determining, by the computer system, that no entitlement associated with an asset stored by the repository system exists that permits the user role to perform the action on the second entity;
   modifying, by the computer system, the query to generate a modified query, wherein the modified query comprises information indicating that the user role is permitted to perform the action on the first entity and that the user role is not permitted to perform the action on the second entity; and
   performing, by the computer system and based upon the modified query, the action on the first entity and not on the second entity.

2. The method of claim 1, wherein determining that no entitlement associated with an asset stored by the repository system exists that permits the user role to perform the action on the second entity comprises:
   determining, by the computer system, that the second entity is associated with a second asset having an associated second entitlement that enables the user role to access the second asset; and
   determining, by the computer system, that the second entitlement does not permit the action to be performed on the second asset, thereby implying that the action is not permitted for the second entity associated with the second asset.

3. The method of claim 2, wherein determining that no entitlement associated with an asset stored by the repository system exists that permits the user role to perform the action on the second entity comprises:
   identifying, by the computer system, a set of actions permitted for the second asset; and
   determining, by the computer system, that the second entitlement does not permit the action to be performed on the second asset based on the set of actions not including the action.

4. The method of claim 1, wherein determining that no entitlement associated with an asset stored by the repository system exists that permits the user role to perform the action on the second entity comprises:
   determining, by the computer system, a set of one or more assets stored by the repository system that are accessible by the user role; and
   determining, by the computer system, that the set of one or more assets does not include an asset that is associated with the second entity.

5. The method of claim 1, wherein determining, based upon the entitlement associated with the first asset, that the action is permitted for the user role for the first asset comprises:
   identifying, by the computer system, a set of actions permitted for the first asset; and
   determining, by the computer system, that the action is permitted for the user role for the first asset based on the action being included in the set of actions.

6. The method of claim 1, wherein the query further indicates a third entity on which the action is to be performed;
   wherein the method further comprises:
      determining, by the computer system, that an obligation associated with the user role, the obligation indicating a set of actions the user role is permitted to perform for the third entity; and
      determining, by the computer system, that the action is permitted for the user role for the third entity based on the obligation.

7. The method of claim 1, wherein the repository system further includes a third entity,
   wherein the query further indicates the third entity;
   wherein the first asset includes a data structure that stores: attribute information of the first asset, first metadata that identify the first entity, and second metadata that identify the third entity, and
   wherein the method further comprises:
      determining, by the computer system, that the first entity is associated with the first asset based on the first asset storing the first metadata;

determining, by the computer system, that the third entity is associated with the first asset based on the first asset storing the second metadata;

determining, by the computer system, that the user role is permitted to perform the action on the first entity based on the first metadata; and determining, by the computer system, that the user role is permitted to perform the action on the third entity based on the second metadata.

8. The method of claim 1, further comprising:

determining, by the computer system, a type of the action; and based on the type of the action, determining, by the computer system, to modify the query to generate the modified query.

9. The method of claim 8, wherein the type of the action is included in a plurality of types of actions comprising: creating an entity, retrieving information associated with an entity, updating information associated with an entity, and deleting an entity.

10. The method of claim 1, wherein the entitlement is determined based on the user role.

11. The method of claim 1, wherein the repository system is part of a computing environment that includes a plurality of objects, wherein each object of the plurality of objects includes an application in the computing environment, a computing device in the computing environment, a process, a service, a method, or a combination thereof.

12. The method of claim 11, wherein the first entity includes information related to an object of the plurality of objects, the object including the at least one of the computing device or the application in the computing environment;

wherein the information related to the object includes: a location of the object, an identifier of the object, a type of the object, a relationship to other types of objects, or a combination thereof; and wherein the first asset stores metadata about a plurality of entities including the first entity.

13. A system comprising:

one or more processors; and a memory accessible to the one or more processors, the memory storing a set of instructions which, when executed by the one or more processors, causes the one or more processors to perform:

receiving, by a computer system, a query indicating a first entity, a second entity, and an action to be performed on the first entity and the second entity, wherein the first entity and the second entity are stored by a repository system;

determining a user role associated with the query;

determining that the first entity is associated with a first asset stored in the repository system;

determining an entitlement associated with the first asset;

determining, based upon the entitlement associated with the first asset, that the action is permitted for the user role for the first asset, thereby implying that the user role is permitted to perform the action on the first entity due to the first entity being associated with the first asset;

determining that no entitlement associated with an asset stored by the repository system exists that permits the user role to perform the action on the second entity;

modifying the query to generate a modified query, wherein the modified query comprises information indicating that the user role is permitted to perform the action on the first entity and that the user role is not permitted to perform the action on the second entity; and performing, based upon the modified query, the action on the first entity and not on the second entity.

14. The system of claim 13, wherein the set of instructions which, when executed by the one or more processors, further causes the one or more processors to further perform:

determining that the second entity is associated with a second asset having an associated second entitlement that enables the user role to access the second asset; and determining that the second entitlement does not permit the action to be performed on the second asset, thereby implying that the action is not permitted for the second entity associated with the second asset.

15. The system of claim 13, wherein the set of instructions which, when executed by the one or more processors, further causes the one or more processors to further perform:

determining a set of one or more assets stored by the repository system that are accessible by the user role; and determining that the set of one or more assets does not include an asset that is associated with the second entity.

16. A non-transitory computer-readable medium storing a set of instructions that are executable by one or more processors to cause the one or more processors to:

receive a query indicating a first entity, a second entity, and an action to be performed on the first entity and the second entity, wherein the first entity and the second entity are stored by a repository system;

determine a user role associated with the query;

determine that the first entity is associated with a first asset stored in the repository system;

determine an entitlement associated with the first asset;

determine, based upon the entitlement associated with the first asset, that the action is permitted for the user role for the first asset, thereby implying that the user role is permitted to perform the action on the first entity due to the first entity being associated with the first asset;

determine that no entitlement associated with an asset stored by the repository system exists that permits the user role to perform the action on the second entity;

modify the query to generate a modified query, wherein the modified query comprises information indicating that the user role is permitted to perform the action on the first entity and that the user role is not permitted to perform the action on the second entity; and perform, based upon the modified query, the action on the first entity and not on the second entity.

17. The non-transitory computer-readable medium of claim 16, wherein the set of instructions are executable by the one or more processors to further cause the one or more processors to:

determine that the second entity is associated with a second asset having an associated second entitlement that enables the user role to access the second asset; and determine that the second entitlement does not permit the action to be performed on the second asset, thereby implying that the action is not permitted for the second entity associated with the second asset.

18. The non-transitory computer-readable medium of claim 16, wherein the set of instructions are executable by the one or more processors to further cause the one or more processors to:
    determine a set of one or more assets stored by the repository system that are accessible by the user role; and
    determine, that the set of one or more assets does not include an asset that is associated with the second entity.

19. The non-transitory computer-readable medium of claim 16,
    wherein the query further indicates a third entity on which the action is to be performed; and
    wherein the set of instructions are executable by the one or more processors to further cause the one or more processors to:
    determine that an obligation associated with the user role, the obligation indicating a set of actions the user role is permitted to perform for the third entity; and
    determine that the action is permitted for the user role for the third entity based on the obligation.

20. The non-transitory computer-readable medium of claim 16, wherein the entitlement is determined based on the user role.

* * * * *

UNITED STATES PATENT AND TRADEMARK OFFICE
CERTIFICATE OF CORRECTION

PATENT NO. : 10,346,632 B2
APPLICATION NO. : 15/715029
DATED : July 9, 2019
INVENTOR(S) : Keyes et al.

Page 1 of 1

It is certified that error appears in the above-identified patent and that said Letters Patent is hereby corrected as shown below:

On the Title Page

Column 2, under the Abstract, Line 2, delete "(e.g." and insert -- (e.g., --, therefor.

Column 2, under the Abstract, Line 3, delete "(e.g. an application a process" and insert -- (e.g., an application, a process, --, therefor.

Column 2, under the Abstract, Lines 8-9, delete "(e.g. create read update" and insert -- (e.g., create, read, update, --, therefor.

Column 2, under the Abstract, Line 10, delete "entitlement" and insert -- entitlement, --, therefor.

Signed and Sealed this
Fourth Day of August, 2020

Andrei Iancu
*Director of the United States Patent and Trademark Office*